United States Patent
Lai

(10) Patent No.: US 7,340,088 B2
(45) Date of Patent: Mar. 4, 2008

(54) MASK CLOSE-ON IMAGE CAPTURING DEVICE

(76) Inventor: Peng-Cheng Lai, 3F, No. 46, Han-Sheng W. Rd., Panchiao (TW)

( * ) Notice: Subject to any disclaimer, the term of this patent is extended or adjusted under 35 U.S.C. 154(b) by 714 days.

(21) Appl. No.: 10/914,181

(22) Filed: Aug. 10, 2004

(65) Prior Publication Data

US 2005/0041142 A1 Feb. 24, 2005

(30) Foreign Application Priority Data

Aug. 19, 2003 (TW) ................................ 92214981 U

(51) Int. Cl.
*G06K 9/00* (2006.01)
(52) U.S. Cl. ........................................ 382/145; 348/370
(58) Field of Classification Search ................ 382/106, 382/145, 212, 255, 283, 274; 348/131, 370
See application file for complete search history.

(56) References Cited

U.S. PATENT DOCUMENTS

| | | | | |
|---|---|---|---|---|
| 5,678,103 A | * | 10/1997 | Tominaga | ................... 396/435 |
| 5,734,461 A | * | 3/1998 | Ishikawa et al. | .............. 355/40 |
| 6,295,076 B1 | * | 9/2001 | Gelbart et al. | .............. 347/171 |

* cited by examiner

*Primary Examiner*—Daniel Mariam

(57) ABSTRACT

This specification discloses a mask close-on image capturing device, which includes a mask with an opening, several light sources and an image capturing device installed inside the mask. Light emitted by the light sources emanates homogeneously from the opening of the mask. The lens of the image capturing device faces the opening of the mask, which is put close to an object. The homogeneous light shines on the object for the image capturing device to focus automatically and quickly capture a clear image. Therefore, the invention has the advantages of being easy and quick to operate and clear images.

10 Claims, 6 Drawing Sheets

MASK CLOSE-ON IMAGE CAPTURING DEVICE

BACKGROUND OF THE INVENTION

1. Field of Invention

The invention relates to an image capturing device and, in particular, to a mask close-on image capturing device to use an image capturing device and homogeneous light to quickly capture an image.

2. Related Art

With the tremendous progress in technologies, image capturing devices such as cameras have become more compact and accurate. Aside from taking everyday pictures, cameras are also widely used for medical purposes to take pictures of human bodies and experimental researches.

When taking the picture of an object, it is usually disposed on a surface of an open or closed space. One then uses a camera from a certain distance. However, taking the digital camera as an example, the resolution of captured images is often unsatisfactory because of fixed focusing, over-exposure, insufficient light or inhomogeneous light. The user has to adjust such factors as light sources, camera's white balance, etc in order to obtained clearer images. This is not only inconvenient, but also takes a longer operation time.

On the other hand, due to the limit of structure in conventional image capturing devices, the camera has be held fixed in order to stably take the pictures of human bodies or local parts of an object. Another commonly seen medical image capturing device fixes the camera in a closed space for the technician to take the picture of an ill part. Although this kind of camera is not handheld, the focusing function of the camera itself is very limited. It further suffers from the problems of inhomogeneous light sources and unclear images. Moreover, even though some image capturing devices are adjustable, it is achieved using tracks and knobs to move and position. They still cannot satisfy the requirement of quick picture taking. Those with the automatic moving function have complicated structures and thus are more expensive.

In view of the foregoing, the invention provides a mask close-on image capturing device that integrates an image capturing device, a mask, and light sources together.

SUMMARY OF THE INVENTION

A primary objective of the invention is to provide a mask close-on image capturing device, which integrates a mask, light sources, and an image capturing device together. When the image capturing device gets focused automatically, the invention can guarantee sufficient and homogeneous light so that clear images can be easily and quickly taken.

Another objective of the invention is to provide a mask close-on image capturing device that, by closing on a target, can readily take the picture of any part of a human body or an object.

A further objective of the invention is to provide a mask close-on image capturing device that, with a zooming mask for different object distances, can obtain high-quality images.

The disclosed mask close-on image capturing device has a mask with an opening, a light source inside the mask to emit homogeneous light via the opening of the mask, and an image capturing device whose lens faces the opening of the mask. By closing the opening of the mask on an object, the image capturing device focuses automatically to quickly capture the image of the object under the homogeneous light.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
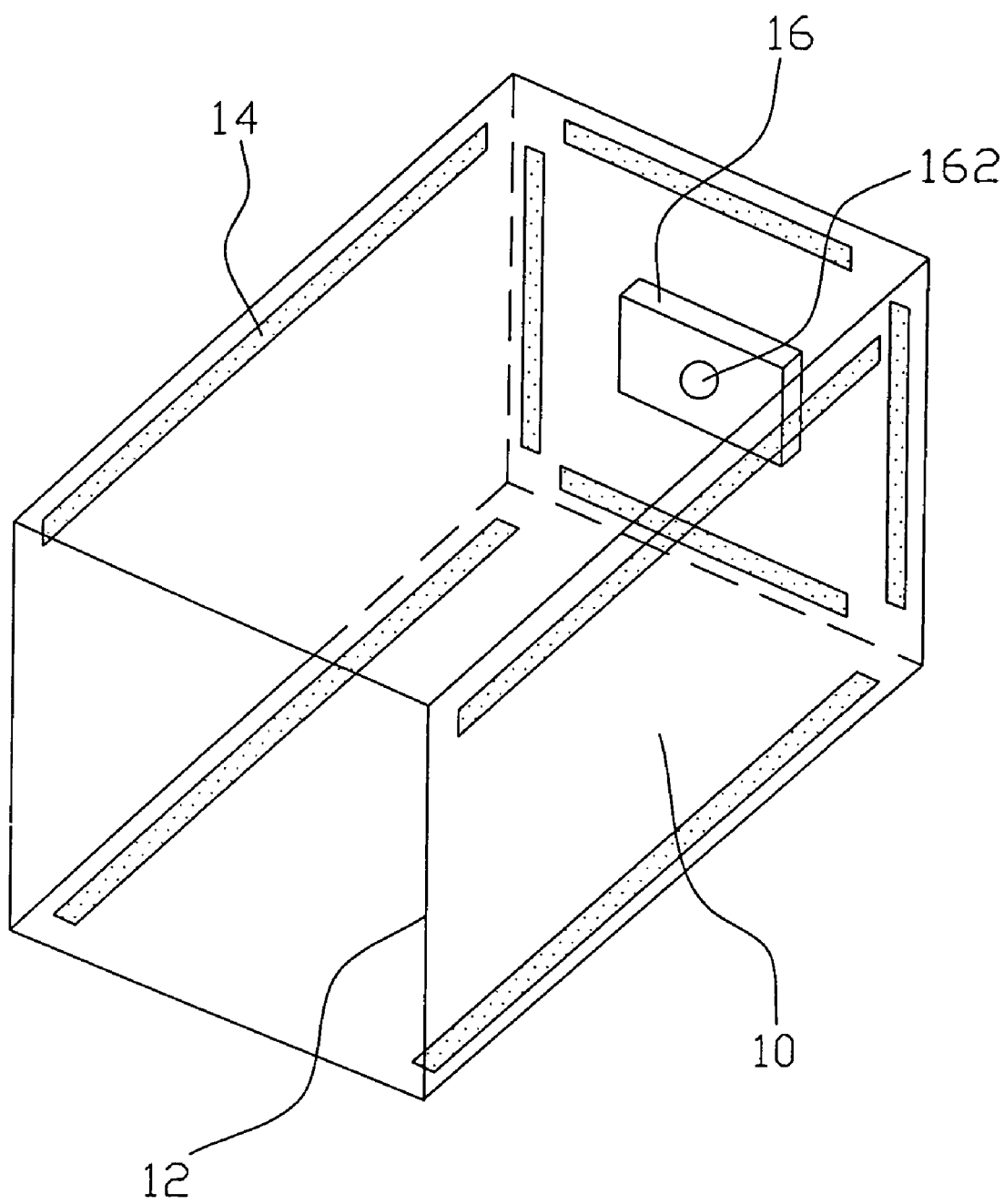
FIG. 1 is a perspective view of the invention.

As shown in FIG. 1, the mask close-on image capturing device includes a mask 10 with an opening 12. The inner wall of the mask 10 is covered with a material that reflects light and prevents it from penetrating through. Common materials include metals, electroplating materials or paints. The mask 10 is installed with several light sources 14 and an image capturing device 16. The light sources 14 are homogeneously installed and fixed on the inner wall or top of the mask 10, emitting light via the opening 12 of the mask 10. The image capturing device 16 is usually a camera, a digital camera, or a digital video camera. It has a control key set (not shown) and a lens 162. The image capturing device 16 is installed inside the mask 10 and on the inner wall opposite to the opening 12. The control key set is exposed on the surface of the mask 10, and the lens 162 faces the opening 12 of the mask 10. By closing the opening 12 of the mask 10 on an object, the image capturing device 16 can quickly capture a clear image of the object at a close distance with the homogeneous light.

Figure 2:
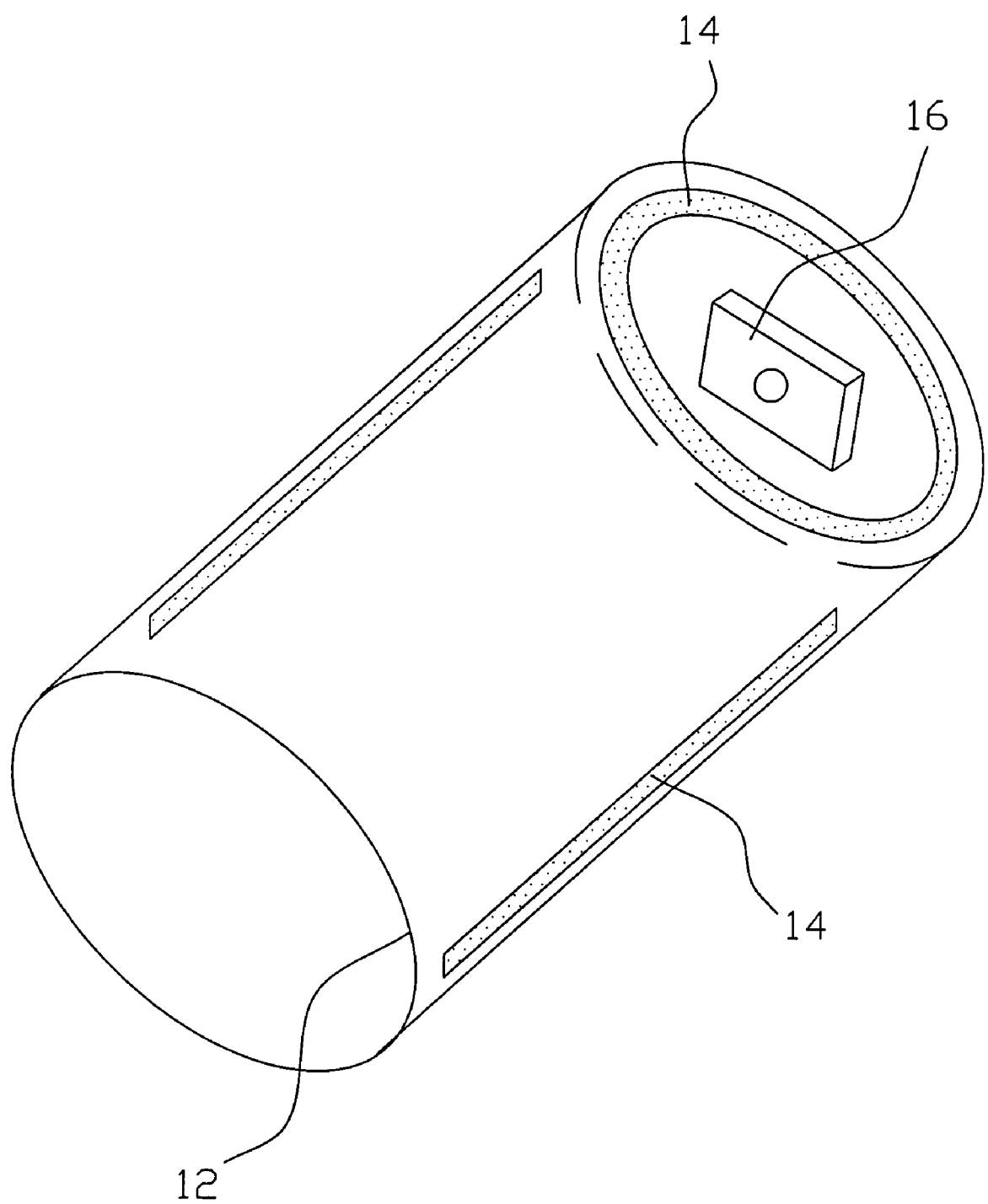
FIGS. 2, 3 and 4 are different embodiments of the invention.
Figure 3:
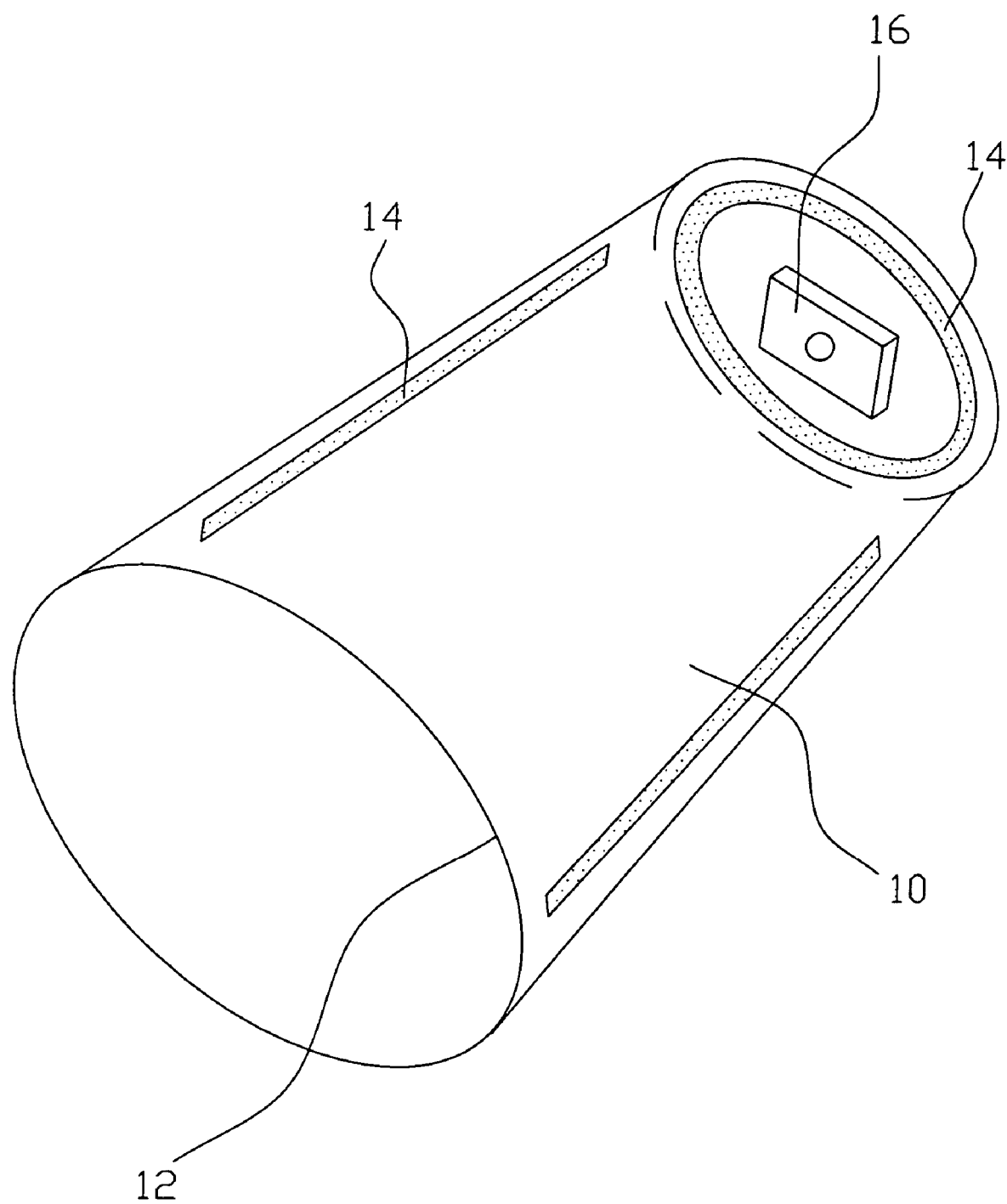
Figure 4:
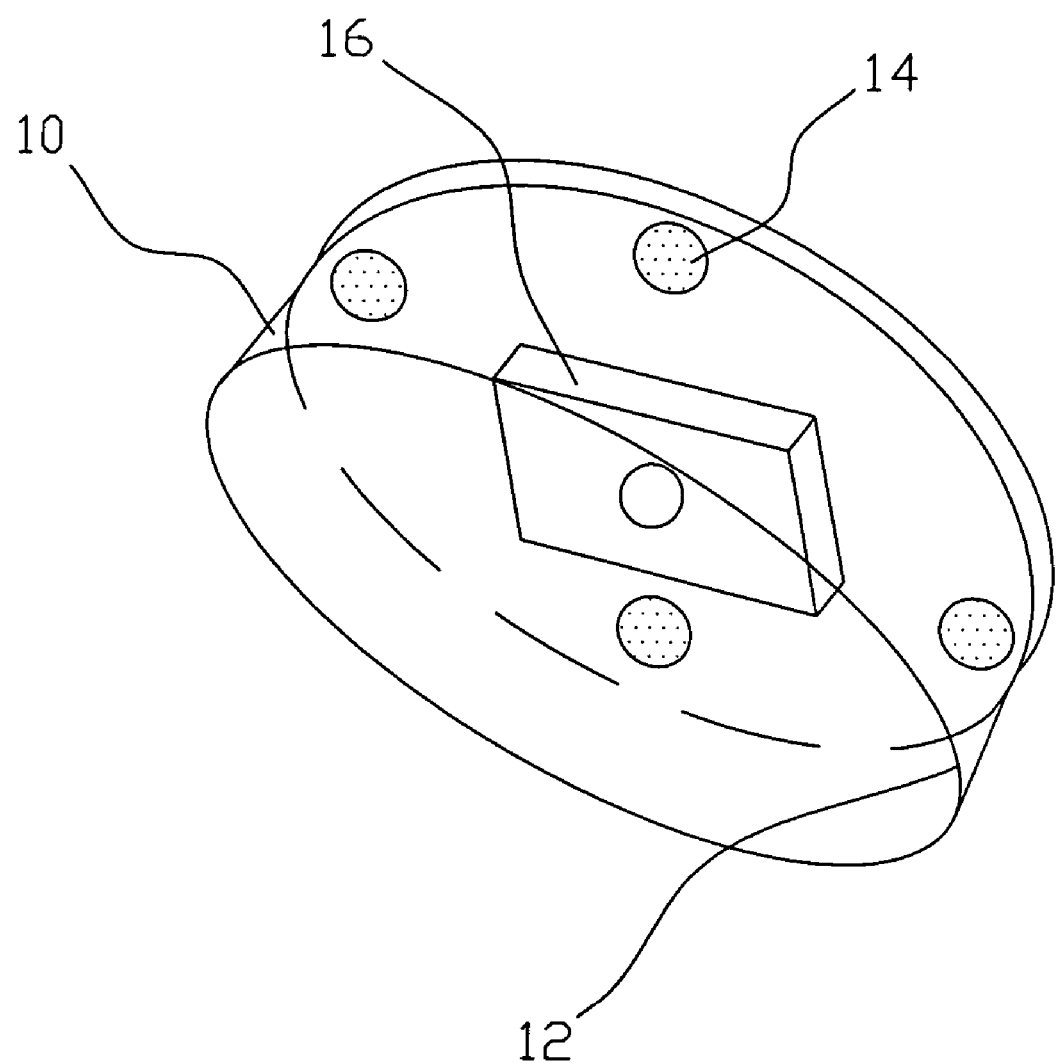

The mask 10 can be a fixed mask on a zooming mask. Its shape is not specified, but usually cylindrical or conic. In FIG. 1, the mask 10 is a cylinder with a square cross section. FIGS. 2, 3, and 4 show another three embodiments of the invention. In FIG. 2, the mask 10 is round conic; in FIG. 3, the mask 10 is round conic; and in FIG. 4, the light sources 14 and the image capturing device 16 are installed on the inner top wall of the mask 10.

Figure 5:
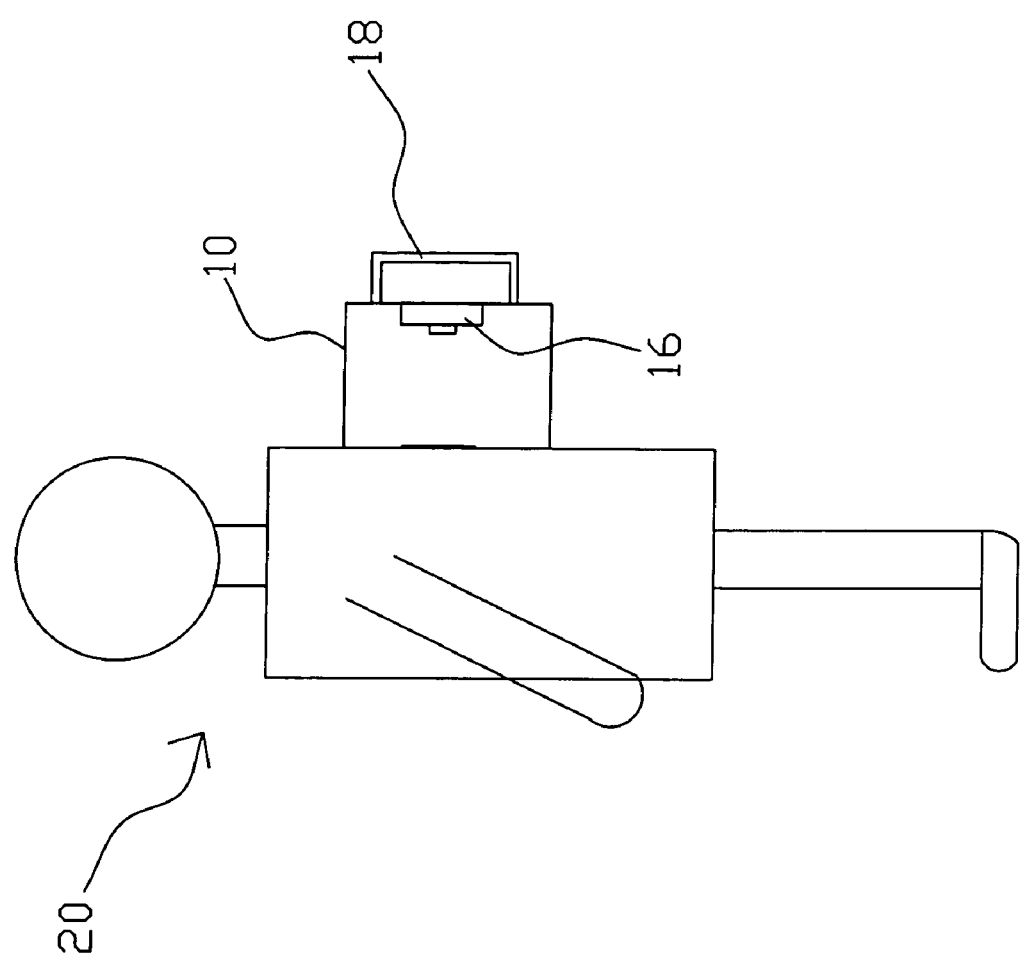
FIG. 5 is a schematic view of an embodiment of the invention in use.

As shown in FIG. 5, the mask 10 is made to be handheld. A handle 18 is provided on the outer surface of the mask 10 for the user to hold. Take the medical image capturing as an example. When the medical technician wants to take a picture of the ill part of wound of a patient 20, he or she directly holds the mask 10 at the handle 18 to puts it close to the part of interest. Then the picture is taken using the homogeneous light source 14 and the image capturing device 16.

The above-mentioned mask 10 is handheld. One operates the control key set of the image capturing device 16 to take pictures. The control key set can be connected to a computer for the computer to control the picture taking. As the embodiment shown in FIG. 6, the image capturing device 16 connects to a signal transmission wire 22, which extends out of the mask 10 for the connection to a computer 24. The computer 14 thus uses the signal transmission wire 22 to control and store the image captured by the image capturing device 16. The signal transmission wire 22 and the computer 24 are connected using an adjustable base 26, which contains a zooming accommodation space 28. A control box 30 is provided at the bottom of the zooming accommodation space 28. A flexible soft tube 32 is provided inside the zooming accommodation space 28, with one end connected to the zooming accommodation space 28 and the other end extending out of the zooming accommodation space 28 to the mask 10. The signal transmission wire 22 connected to the image capturing device 16 extends inside the soft tube 32 and connects to the control box 30. The control box 30 further transmits the signal to the computer 24. The flexible soft tube 32 and the zooming accommodation space 28 are adjusted to determine the position and angle of the mask 10. The computer 24 is also used to control the operation parameters and actions of the image capturing device 16.

Figure 6:
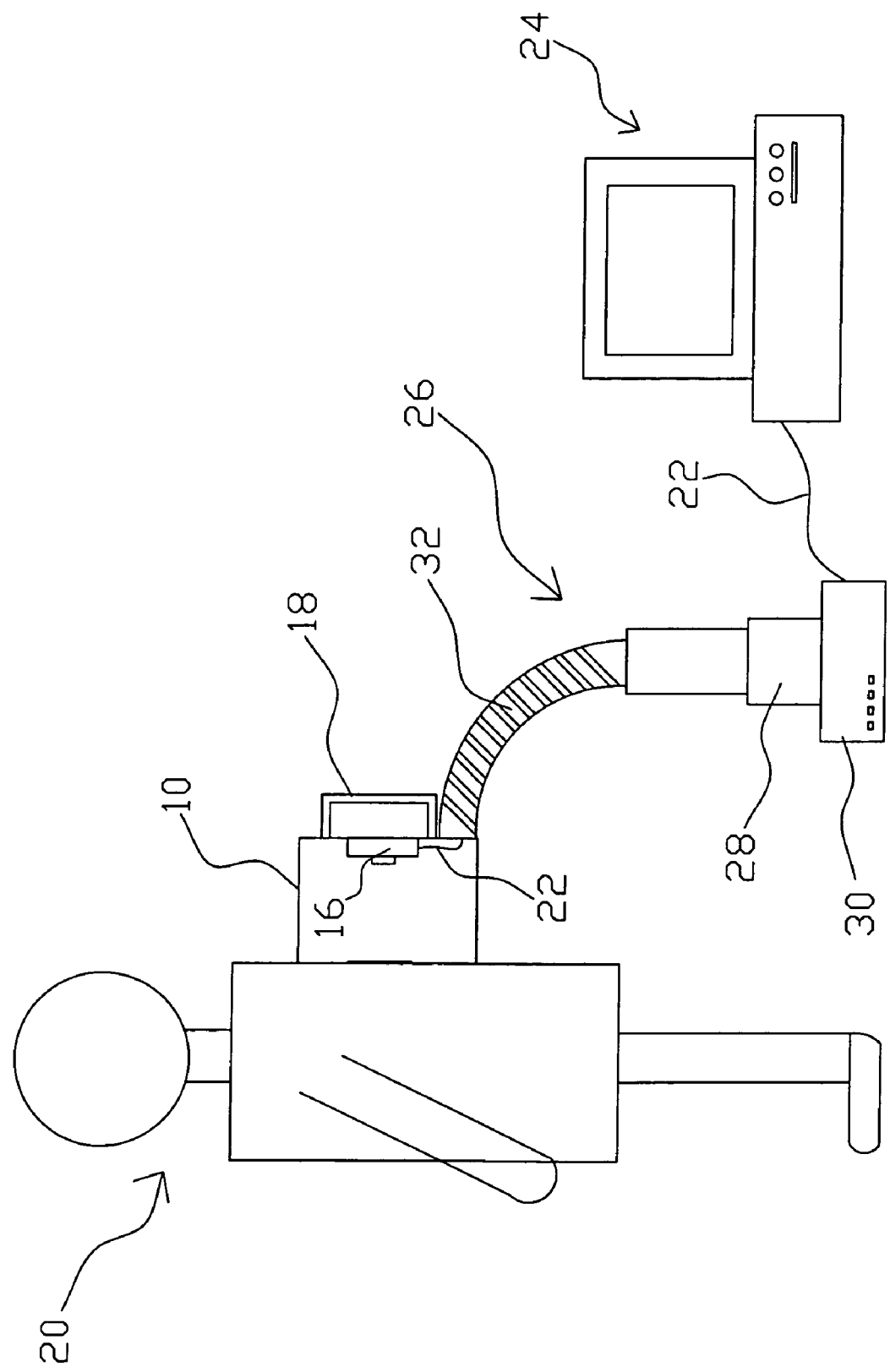
FIG. 6 is a schematic view of another embodiment in use.

When using the invention, as shown in FIG. 5, the user can put it close to an object or human body to take pictures. One can also adjust the zooming accommodation space 28 and the flexible soft tube 32 to adjust the height, horizontal displacement, and angle to get close to the object, as shown in FIG. 6. Take the digital camera as an example. If the distance is not fixed, the user can switch to the auto mode of the digital camera or set the digital camera at the manual mode. If a computer 24 is used to control the digital camera, it is set to the manual mode in order for the computer 24 to control the preset aperture, speed, etc of the camera via the signal transmission wire 22. In either case, the mask 10 is used to provide reflective light and to prevent light from penetrating through. The light sources 14 provide sufficient and homogeneous light. The image capturing device 16 is employed to capture images of a human body or object. As a result, images with a better quality can be obtained using the disclosed mask close-on image capturing device.

According to the invention, the mask close-on image capturing device can be used for medical purposes, human body or face focus, and experimental researches. It provides a convenient and excellent tool for taking pictures.

The invention integrates a mask, light sources, and an image capturing device together. It ensures sufficient and homogeneous illumination. The zooming of the mask helps taking pictures at different distances. Clear, high-quality images can be conveniently obtained. Moreover, using the close-on mode of the invention can more readily capture the image of any part of an object than the prior art.

Certain variations would be apparent to those skilled in the art, which variations are considered within the spirit and scope of the claimed invention.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A mask close-on image capturing device, comprising:
    a mask, which has an opening;
    a light source, which is installed inside the mask and the light emitted from which emanates homogeneously from the opening of the mask; and
    an image capturing device, which is installed inside the mask and the lens of which faces the opening of the mask;
    wherein by closing the opening of the mask on an object, the image capturing device with the homogeneous light quickly captures a clear image of the object at a short distance.

2. The mask close-on image capturing device of claim 1, wherein the image capturing device is fixed on the inner wall of the mask opposite to the opening and the control key set of the image capturing device is exposed on the surface of the mask both for the user to control the image taking and for the connection to a computer that controls the image taking.

3. The mask close-on image capturing device of claim 1, wherein the image capturing device is connected with a signal transmission wire extending out of the mask for the connection to a computer system that controls the image capturing device and stores images taken by the image capturing device via the signal transmission wire.

4. The mask close-on image capturing device of claim 3, wherein the mask is installed on an adjustable base that includes:
    a zooming accommodation space; and
    a flexible soft tube, whose one end is connected to the zooming accommodation space and whose other end is connected to the mask so that the signal transmission wire connects to the computer system via the soft tube;
    wherein the zooming accommodation space and the flexible soft tube are adjusted to determine the position and angle of the mask.

5. The mask close-on image capturing device of claim 1, wherein a handle is provided on the outer surface of the mask.

6. The mask close-on image capturing device of claim 1, wherein the image capturing device is selected from the group comprising a camera, a digital camera, and a digital video camera.

7. The mask close-on image capturing device of claim 1, wherein the mask is selected from the group comprising a fixed mask on a zooming mask.

8. The mask close-on image capturing device of claim 1, wherein the shape of the mask is selected from the group comprising a polygonal cylinder, a round cylinder, a polygonal cone, and a round cone.

9. The mask close-on image capturing device of claim 1, wherein the light source is fixed on the inner wall of the mask.

10. The mask close-on image capturing device of claim 1, wherein the light source is fixed on the top inner wall of the mask.

* * * * *